(12) United States Patent
Fuchs et al.

(10) Patent No.: US 8,224,032 B2
(45) Date of Patent: Jul. 17, 2012

(54) APPARATUS AND METHOD FOR MONITORING A SPATIAL AREA, IN PARTICULAR FOR SAFEGUARDING A HAZARDOUS AREA OF AN AUTOMATICALLY OPERATED INSTALLATION

(75) Inventors: Oliver Fuchs, Esslingen (DE); Martin Wendler, Stuttgart (DE); Dietmar Doettling, Leinfelden-Echterdingen (DE)

(73) Assignee: Pilz GmbH & Co. KG, Ostfildern (DE)

( * ) Notice: Subject to any disclaimer, the term of this patent is extended or adjusted under 35 U.S.C. 154(b) by 842 days.

(21) Appl. No.: 12/119,769

(22) Filed: May 13, 2008

(65) Prior Publication Data

US 2008/0273758 A1    Nov. 6, 2008

Related U.S. Application Data

(63) Continuation of application No. PCT/EP2006/010886, filed on Nov. 14, 2006.

(30) Foreign Application Priority Data

Nov. 14, 2005  (DE) .................... 10 2005 056 265

(51) Int. Cl.
*G06K 9/00* (2006.01)

(52) U.S. Cl. ............... 382/106; 382/141; 356/3; 348/82
(58) Field of Classification Search ............ 382/106, 382/141; 356/3; 348/82
See application file for complete search history.

(56) References Cited

U.S. PATENT DOCUMENTS

| | | | |
|---|---|---|---|
| 4,716,430 A | 12/1987 | Stauffer | |
| 5,247,296 A | 9/1993 | Spies | |
| 5,856,667 A | 1/1999 | Spirig et al. | |
| 6,373,557 B1 | 4/2002 | Mengel et al. | |
| 6,636,300 B2 | 10/2003 | Doemens et al. | |
| 6,757,009 B1 | 6/2004 | Simon et al. | |
| 6,823,261 B2 | 11/2004 | Sekiguchi | |
| 7,729,511 B2 | 6/2010 | Wöhler et al. | |
| 2003/0030723 A1* | 2/2003 | Dottling et al. | 348/82 |
| 2005/0207619 A1* | 9/2005 | Lohmann | 382/103 |
| 2005/0276509 A1* | 12/2005 | Chou | 382/275 |
| 2006/0228050 A1 | 10/2006 | Xu et al. | |

FOREIGN PATENT DOCUMENTS

| | | |
|---|---|---|
| DE | 39 22 085 C1 | 1/1991 |
| DE | 42 17 423 A1 | 2/1994 |
| DE | 43 28 553 A1 | 11/1994 |

(Continued)

*Primary Examiner* — Jingge Wu
*Assistant Examiner* — Shefali Goradia
(74) *Attorney, Agent, or Firm* — Harness, Dickey & Pierce, P.L.C.

(57) ABSTRACT

An apparatus for monitoring a spatial area, in particular for safeguarding a hazardous area of an automatically operated installation, comprises an illumination device which at least temporarily emits light signals into the spatial area. A first image recording unit records a first image of the spatial area. The first image recording unit comprises an image sensor having a plurality of pixels. An evaluation unit determines a distance value for at least one spatial area point, which is located in the spatial area and is imaged on at least one pixel, by means of a propagation type measurement. The propagation type measurement suffers from a limited unambiguity range. Therefore, a test device is designed to check the distance value by means of a reference distance value determined from a second image of said spatial area.

18 Claims, 4 Drawing Sheets

FOREIGN PATENT DOCUMENTS

| | | |
|---|---|---|
| DE | 44 40 613 C1 | 7/1996 |
| DE | 199 38 639 A1 | 2/2001 |
| DE | 100 33 608 A1 | 2/2002 |
| DE | 102 38 075 A1 | 3/2004 |
| DE | 10 2004 028 090 | 12/2005 |
| DE | 10 2004 037 137 | 3/2006 |
| EP | 0 192 993 | 9/1986 |
| EP | 0 885 782 A1 | 12/1998 |
| EP | 1 065 522 B1 | 1/2001 |
| EP | 1 544 535 A1 | 6/2005 |
| JP | 10-9834 | 1/1998 |
| JP | 2003-139858 | 5/2003 |
| WO | WO 99/34235 | 7/1999 |
| WO | WO 00/55642 | 9/2000 |
| WO | WO 2004/029502 | 4/2004 |
| WO | 2004/055544 A1 | 7/2004 |

\* cited by examiner

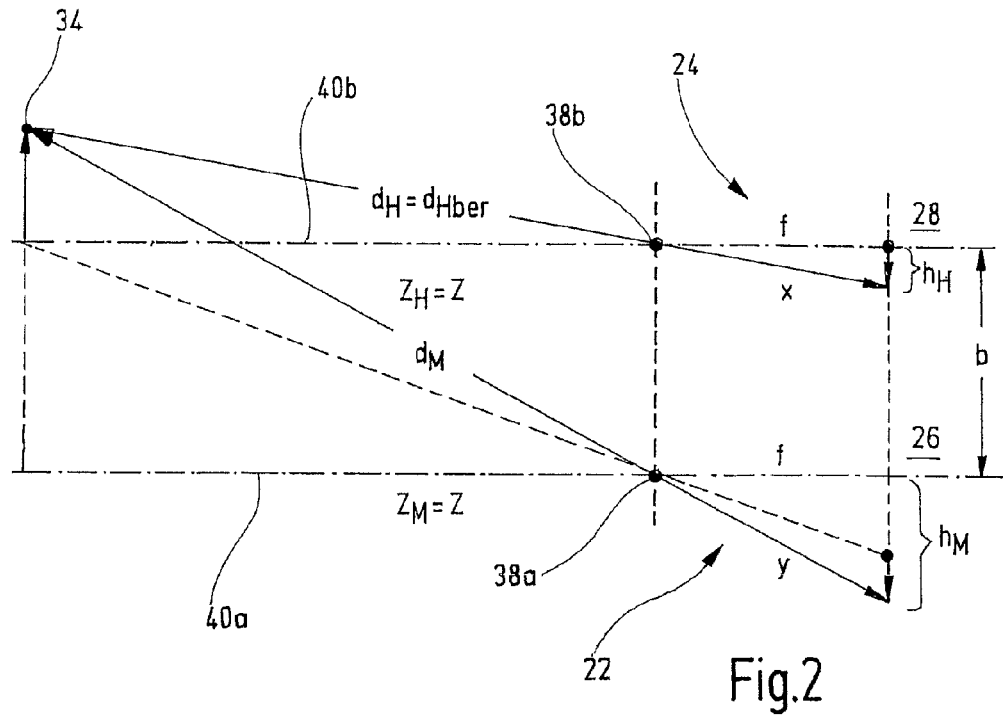
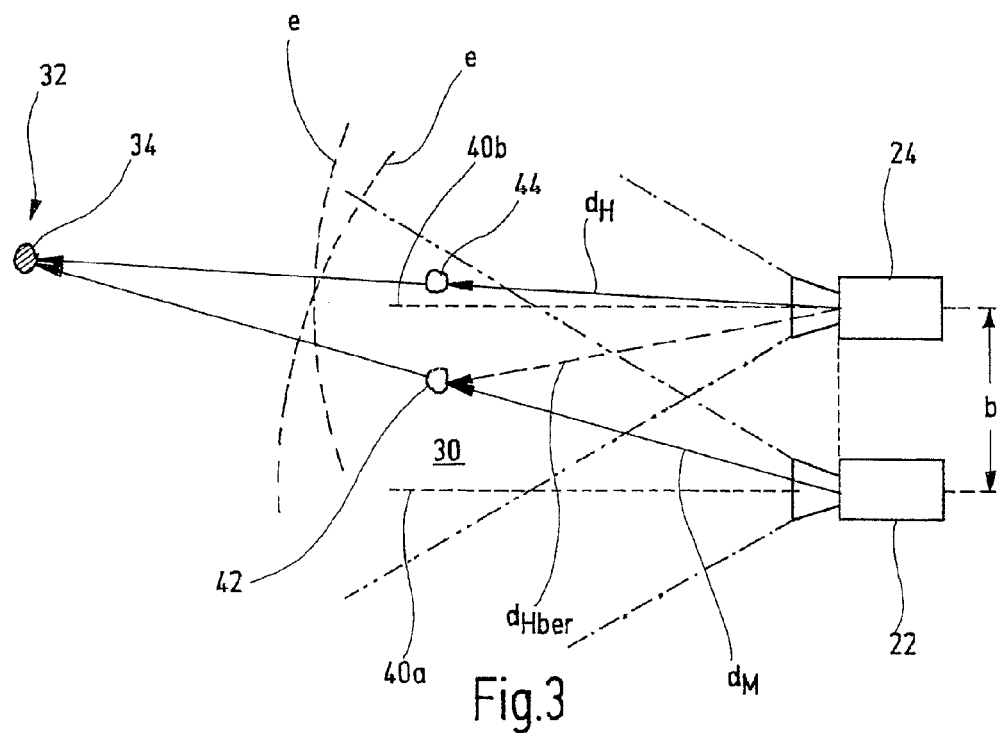

APPARATUS AND METHOD FOR MONITORING A SPATIAL AREA, IN PARTICULAR FOR SAFEGUARDING A HAZARDOUS AREA OF AN AUTOMATICALLY OPERATED INSTALLATION

CROSS-REFERENCES TO RELATED APPLICATIONS

This application is a continuation of international patent application PCT/EP2006/010886, filed on Nov. 14, 2006 designating the U.S., which international patent application has been published in German language as WO 2007/054359 and claims priority from German patent application DE 10 2005 056 265.5, filed on Nov. 14, 2005. The entire contents of these priority applications are incorporated herein by reference.

BACKGROUND OF THE INVENTION

The present invention relates to an apparatus and a method for monitoring a spatial area on the basis of images of the spatial area. More particularly, the invention relates to an apparatus and a method for safeguarding a hazardous area of an automatically operated installation using cameras for recording images of the area.

Beside mechanical barriers, light barriers and light grids have long been known and are often used for safeguarding a hazardous area of an automatically operated installation, such as robots, press lines, conveyer belts. The light barriers and light grids form a "light fence" in front of the installation to be safeguarded. If anyone passes through the light fence, this is detected by an evaluation unit, and is signaled to a control unit. The control unit typically initiates a safety function, such as shutting down the safeguarded installation or bringing it into a safe state in some other way.

Light barriers have been proven suitable for this purpose for a very long time. However, they have a couple of disadvantages. For example, the installation of light barriers is rather complex since the transmitters and receivers, which are at a distance from one another, must be exactly aligned. Furthermore, only a straight "fence profile" can be achieved by a light barrier. In order to protect a danger area of an installation on a plurality of sides or along a curved periphery, a plurality of light barriers or light grid systems are required. Furthermore, it should be noted that a large number of light sources and sensors are required for reliable detection of small objects.

In order to overcome these disadvantages, efforts have been made for some time to safeguard hazardous areas of automatically operated installations by means of image recording and image evaluation apparatus. In this case, a spatial area is optically monitored by one or more cameras. The recorded images are evaluated automatically and as far as possible in real time in order to detect a danger situation, for example somebody entering a hazardous area of the installation.

DE 199 38 639 A1 proposes an optical barrier which extends between a defined target and an image recording unit which images the target. A reference image which is obtained when the image recording unit has a free view of the defined target is stored in a comparison unit. If an object now passes between the image recording unit and the target, the comparison unit detects a difference between the current image and the previously stored reference image. The entry of an object is identified from this discrepancy and, for example, a machine operating in the hazardous area is stopped. This approach already reduces the complexity for safeguarding extended danger areas or those with complex shapes in comparison to conventional light barriers and light girds. However, safeguarding is still achieved by a largely predefined and fixed "fence", i.e. a dynamic boundary around the hazardous area is possible only to a very limited extent.

DE 100 33 608 A1 proposed to use an artificial target in the form of a defined light signal, which is produced by means of a light source. In this case, the light signal is projected onto an object or onto a background. An image recording unit which is directed to the artificial target images the target. In this case as well, the current image is compared with a reference image in a comparison unit, and safety measures are taken in the event of a discrepancy.

WO 99/34235 discloses a method and an apparatus for recording a three-dimensional distance image. In this case, an image recording unit is directed at a spatial area. The spatial area is illuminated by at least one light pulse having a predetermined time duration. Objects located in the spatial area reflect the light pulses to the image recording unit. Different propagation times lead to different intensities of the reflected light pulses, and distance values relating to the objects are determined from these intensities. Known reference distance values can then be used to determine whether a further object has entered the spatial area. This apparatus and method, however, do not seem suitable for safeguarding automatically operating installations since the determination of the distance values may be subject to errors which cannot be detected.

WO 2004/029502 A1 proposes that the spatial area to be monitored is recorded stereoscopically by means of two cameras. The images of the first image camera and the second camera are evaluated using two algorithmically different methods for three-dimensional scene analysis. If one of the methods leads to the result that an object is located in the danger area, the monitored installation is shut down. Methods for three-dimensional scene analysis, unfortunately, require a high computational effort, making a real-time implementation difficult and expensive.

DE 42 17 423 A1 and EP 1 065 522 B1 proposed propagation time measurement methods for evaluation of images of a spatial area. This approach has the general advantage over triangulation methods using two or more cameras that only one camera is required, so that no shadowed areas and no incomplete measurements occur, since the transmitter and the receiver can be arranged collinearly. Because, however, the propagation times of the light wave are extremely short, these methods have the disadvantage that the stability of the signal processing and propagation times in the associated electronic circuits is subject to very stringent requirements, and changes in the electrical propagation times, such as changes resulting from temperature influences and aging, must be taken into account by continuous calibration. If the propagation time difference is measured by means of a brightness difference, any change in the actual pixel characteristic in comparison to the stored pixel characteristic has a considerable influence on the measured distance value. However, since the distance value is of major importance for identification of an object, any drift in the pixel characteristic has considerable effects.

An important aspect for use in machine safety applications, which has been ignored until now, is the fact that the phase shifts or pulse propagation times on which the propagation time methods are based are unique or unambiguous only within specific range limits. In the case of pulse propagation time methods, the amplitude of the light wave is modulated in a pulsed form with a high duty ratio, i.e. with a low modulation frequency. In this case, the process determines the time passed between the emission and the return of the light signal from reflecting objects. In this case, it is generally possible that a reflection occurs from an object at a long distance away which is not received until a subsequent measurement interval has started. This reflection will then be incorrectly associated to a shorter distance value. In the case of phase propagation time methods, the amplitude of the light wave is modulated at a frequency in the radio-frequency range. The propagation time of the measurement signal is determined from a phase comparison of the modulation of the emitted light wave and the modulation of the arriving light wave. In this case as well, the maximum phase difference of 360° means that an object at a long distance away could produce a reflection which is associated with a closer spatial point. In other words, all propagation time measurements are subject to ambiguities which endanger reliable distance determination.

Correct distance determination is especially critical for so-called retroreflectors, which reflect incoming light back at high intensities and into just the same direction where it came from. When the light is reflected from such a retro-reflector to the image recording unit, this can easily lead to the installation being shut down even though the situation is not dangerous. On the other hand, in the worst case, this can even lead to a necessary shut down not being carried out, or not being carried out in good time.

SUMMARY OF THE INVENTION

Against this background, it is an object of the present invention to provide a low-cost apparatus and a method for monitoring a spatial area and in particular for safeguarding a hazardous area of an automatically operated installation. It is another object to provide such an apparatus and method with an increased fail-safety and little complexity, when propagation time measurements are used for determining distances.

According to one aspect of the invention, there is provided an apparatus for safeguarding a hazardous area of an automatically operated installation, the apparatus comprising an image recording unit designed to record at least one first and one second image of the hazardous area, the image recording unit comprising at least one image sensor having a plurality of pixels for imaging a plurality of area points located in the hazardous area, an illumination device designed to emit light signals into the hazardous area in order to illuminate the plurality of area points, an evaluation unit designed to determine a first distance value for at least one area point by means of a propagation time measurement using the light signals and the first image, the propagation time measurement having a limited unambiguity range, a control unit configured to initiate a safety function depending on the distance value determined, the safety function being configured to safeguard the installation, and a test device designed to detect an incorrectly determined distance value resulting from the limited unambiguity range, the test device being designed to check the distance value by means of the second image.

According to another aspect, there is provided a method comprising the steps of emitting light signals into the hazardous area by means of an illumination device in order to illuminate a plurality of area points located in the hazardous area, recording at least one first and one second image of the hazardous area by means of an image recording unit, the image recording unit comprising at least one image sensor having a plurality of pixels for imaging the plurality of area points, determine a first distance value for at least one area point by means of a propagation time measurement using the light signals and the first image, the propagation time measurement having a limited unambiguity range, checking the distance value by means of the second image in order to detect any incorrectly determined distance value resulting from the limited unambiguity range, and initiating a safety function depending on the distance value for safeguarding the installation.

According to yet another object, there is provided an apparatus for monitoring a spatial area, comprising an illumination device which at least temporarily emits first light signals into the spatial area, comprising an image recording unit for recording a first image and at least one second image of the spatial area, the image recording unit comprising at least one image sensor having a plurality of pixels for imaging a plurality of spatial area points, comprising an evaluation unit designed to determine a first distance value for at least one of the spatial area points using a first propagation time measurement in conjunction with the first image and the first light signals, comprising a control unit which initiates a safety function depending on the first distance value, and comprising a test device designed to check the first distance value by means of a reference distance value determined for the at least one spatial area point, said reference distance value being determined by means of the second image.

According to a feature of the invention, at least one first and one second image are recorded of a monitored spatial area, wherein distance information determined by means of a propagation time method is contained in at least the first image. A process is then carried out in a test device for all or for some of the recorded spatial area points to determine whether the (first) distance value determined in the first image for the respective spatial area point matches a (second) distance value, determined on the basis of the second image, for the same spatial area point within a predetermined tolerance band. In other words, the embodiments of the invention include a check of the (first) distance value obtained from the propagation time information, on the basis of a second image and a second distance determination process based on the second image, for the same spatial area point. If these do not match, a fault action is initiated, and, advantageously, a safety function might be initiated, such as to shut down a monitored machine. If, in contrast, a match is found, the distance measurement can be assumed to be correct and can be evaluated further. If the evaluation indicates that an object is located in an area that has been defined as a safeguarded area which must not be entered, the control unit reacts to this with the safety function, such as by shutting down the installation. This makes it possible to provide a low-cost apparatus and a method based on the principle of propagation time measurement, while ensuring better failsafety. In particular, this makes it possible to resolve ambiguities which result from the propagation time measurement, in order to determine the actual distance to a spatial point in a fail-safe manner.

It should be noted that the term "image" should not be construed as just meaning perception by the human eye. Other wavelengths, such as infrared, might be used. In addition, advantageous embodiments of the invention make use of image sensors comprising an integrated distance measuring unit based on propagation methods.

In a refinement of the invention, the test device is designed to correct an incorrect distance value and/or to generate a fault signal.

If no matching distance values have been obtained for a spatial area point, this may be the consequence of an ambiguity in the propagation-time-based distance measurement, or the consequence of a malfunction. This refinement advantageously attempts to find the reason for distance values which differ from one another and to resolve any mismatch resulting from ambiguity, in order to prevent unnecessary shut down of the installation. The refinement therefore has the advantage that the monitored installation can operate more productively with equal or even better safety.

In the case of a pulse propagation time method, the unambiguity range is defined by the distance which the light travels within half the time of the time interval between the individual pulses (the forward and return path must be taken into account). In the case of a phase propagation time method, the unambiguity range is defined by half the length of the distance (once again, the forward and return paths must be considered), along which the light wave experiences a phase change of at most 360°. Based on this result, any ambiguity can be resolved very easily by means of a search process, namely by checking whether there are matching distance values when the spatial area point is assumed to have been moved further away through a distance which corresponds to the unambiguity range. Taking account of this knowledge, the test device now attempts to determine a matching distance value, on the assumption that the spatial area point is outside the unambiguity range. If this is possible, then it can be assumed that the actual distance value has been found, even though it is outside the unambiguity range. If no match can be found even taking account of ambiguities, then a malfunction is assumed. In this situation, a fault signal can then be generated by the test device.

In a further refinement, the apparatus comprises a modulation device designed to modulate the light signals with at least one first modulation frequency and with a second modulation frequency which differs from the first modulation frequency. The first image is advantageously recorded with light emitted at the first modulation frequency, and the second image is recorded with light emitted at the second modulation frequency.

Different modulation frequencies lead to different unambiguity ranges. If the modulation frequencies are chosen such that the resultant unambiguity ranges are not related to one another by an integer ratio, potential ambiguities can be easily resolved. The first modulation frequency is preferably chosen between 10 MHz and 20 MHz, preferably between 13 MHz and 17 MHz, and in particular at about 15 MHz. The second modulation frequency is preferably chosen between 8 MHz and 18 MHz, preferably between 11 MHz and 15 MHz, and in particular at about 13 MHz.

It is also preferable for the apparatus to have a second image recording unit for production of the second image.

This allows the first and second image to be recorded at the same time, allowing a higher processing speed to be achieved. In addition, such a refinement allows distance determination on the basis of the second image by means of a triangulation method, thus allowing ambiguities in the propagation time measurement to be identified and resolved very reliably.

For the last-mentioned reason, it is also advantageous for the first and the second image recording unit to be offset parallel to one another by a defined base width, in particular in order to produce stereoscopic images.

In this refinement, there is a defined geometric relationship between the two image recording units, so that the two images, to be more precise the spatial area points represented in the images, can be correlated well with one another. This allows a second distance value to be determined relatively easily for the spatial point under consideration. This refinement offers particularly good fail-safety, because of the different measurement approaches.

In a further refinement, the apparatus has at least one beam splitter for splitting the light signals reflected from the spatial area point between the first and the second image recording unit.

In this arrangement, both image recording units have the same viewing point and the same viewing direction of the spatial area to be monitored. In consequence, every spatial area point is imaged at the same position in the first image and in the second image. Correlation of the spatial area points in the first and the second image is therefore particularly simple. In addition, shadowing effects are avoided, i.e. both image recording units can see the entire spatial area being monitored.

In a further refinement of the invention, the illumination device is designed to emit light at least two different wavelengths. Furthermore, the first image recording unit is associated with a first optical filter element having a first wavelength pass band, and the second image recording unit is associated with a second optical filter element having a second wavelength pass band, with the first wavelength pass band corresponding essentially to the first wavelength of the emitted light, and the second wavelength pass band corresponding essentially to the second wavelength of the emitted light.

It is therefore possible for the illumination device to emit light at two wavelengths at the same time, but nevertheless for each image recording unit always to record only image information based on one one of the wavelengths. Propagation time measurement ambiguities can thus easily be resolved, namely by each of the two wavelengths being transmitted with another modulation frequency. Instead of using filter elements, a wavelength-selective beam splitter can also be used, which passes light at the first wavelength to the first image recording unit, and light at the second wavelength to the second image recording unit.

In a further refinement of the invention, gray-scale values are recorded and compared for at least one first pixel in the first image recording unit and a second pixel in the second image recording unit.

One simple possible way to check the correlation of the first pixel with the second pixel is to compare the gray-scale values of the two pixels. In this case, it is assumed that one and the same spatial area point is produced with the same gray-scale value (within certain tolerances) both in the first and in the second image.

It is self-evident that the features mentioned above and those which will be explained in the following text can be used not only in the respectively stated combination but also in other combinations or on their own without departing from the scope of the present invention.

BRIEF DESCRIPTION OF THE DRAWINGS

Exemplary embodiments of the invention will be explained in more detail in the following description, and are illustrated in more detail in the drawing, in which:

FIG. 2 shows a schematic illustration of the geometric relationships used according to the invention;

FIG. 3 shows a schematic illustration, showing the treatment of signals which are reflected from a retro-reflector;

DESCRIPTION OF PREFERRED EMBODIMENTS

Figure 1:
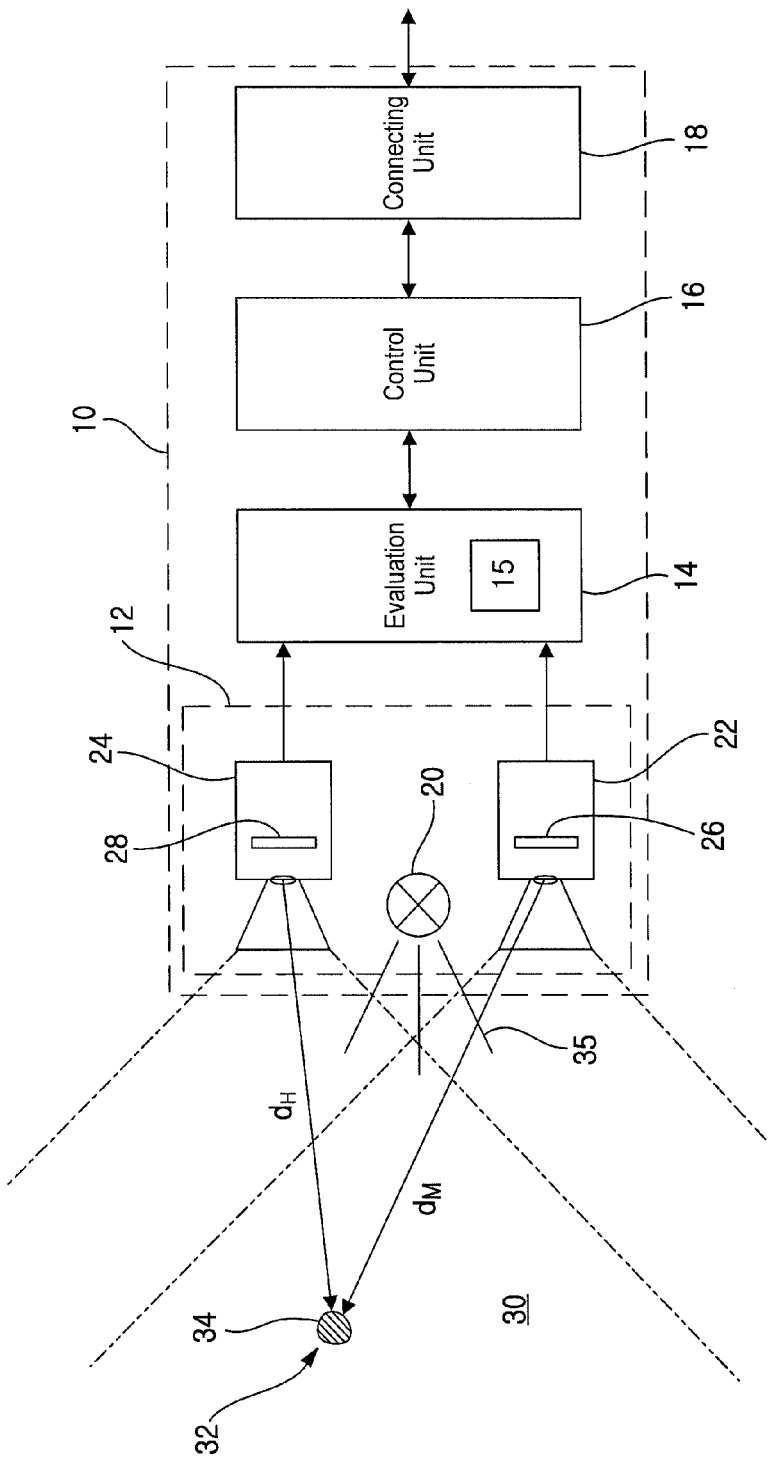
FIG. 1 shows a simplified illustration of an apparatus according to the invention.

In FIG. 1, an exemplary embodiment of an apparatus according to the invention is designated in its entirety by reference number 10.

The apparatus 10 comprises a sensor part 12, an evaluation unit 14 including a test device 15, a control unit 16, and a connecting unit 18. The sensor part 12 has an illumination device 20, a first camera 22 and a second camera 24. The first camera 22 comprises a first image sensor 26, and the second camera 24 comprises a second image sensor 28, with each image sensor 26, 28 having a plurality of pixels arranged like a matrix with respect to one another. In addition, each camera has imaging optics, which define an optical coverage range. The two coverage ranges of the first and second camera 22, 24 are illustrated by dashed-dotted lines, with a common coverage range 30 resulting from the overlap of the individual coverage ranges of the two cameras being symbolically represented by a dashed-double-dotted line. An object 32 is located within the common coverage range 30 and is typically imaged on a plurality of pixels of the image sensors 26, 28, because of its physical extent. In order to simplify the explanation of the method according to the invention, the following text considers just one spatial area point 34 on the object 32.

The illumination device 20 emits light and illuminates the spatial area located in front of the sensor part 12. The light 35, which is indicated by means of the three solid lines here, passes inter alia to the spatial area point 34 and is reflected from there. A portion of the reflected light is passed to the first camera 22, and another portion of the light to the second camera 24. The first and the second cameras 22, 24 are each designed to determine the propagation time (pulse propagation time or phase propagation time) of the transmitted and reflected light. They pass the results of the propagation time measurements to the evaluation unit 14, where the propagation times are used to determine the distances $d_H$, $d_M$ which can be associated with the spatial area point 34 imaged on the respective image sensor 26, 28. (It is also possible for the evaluation unit 14 to be integrated in each of the cameras 22, 24, so that the cameras are in the form of so-called distance cameras and each produces a range measurement value $d_H$, $d_M$.) This therefore results in a first distance value $d_M$ for the distance between the first camera 22 and the spatial area point 34, and a second distance value $d_H$ for the distance from the second camera 24 to the spatial area point 34. The determined distance values $d_M$, $d_H$ are checked for plausibility by the test device 15, as will be explained in more detail in the following text. The evaluation process is carried out for all the pixels of the image sensors 26, 28 or for some of the pixels.

The resulting distance image can be compared with a previously stored reference image. A nominal state can be stored in the form of such a reference image, which nominal state may be a precondition for starting the automatically operated installation. By way of example, such a reference image may be stored once or can be determined again when required. Furthermore, one or more areas which are not intended to be monitored can be defined within the reference image, so that changes in this part of the image are ignored and are not used to initiate the safety function. Conversely, it is also possible to specify precisely those areas which are intended to be monitored.

The result of the evaluation is transmitted to the control unit 16 which initiates a safety function depending on the result. The link between the control unit 16 and the automatically operating installation, which is not illustrated here, may be implemented by means of connecting unit 18 (for example with output switching elements or a bus coupling). In addition, it should be noted that the first and the second camera 22, 24 may additionally detect gray-scale values of the spatial area being monitored, and can therefore provide additional information for evaluation of the images. It is also possible for the evaluation unit 14 and/or the control unit 16 to be provided in separate assemblies. For example, the control unit 16 may be a safe control unit, such as those marketed by the assignee of the present invention under the brand name PSS®.

FIG. 2 shows the optically relevant geometries of the first and second camera 22, 24. The imaging optics of the first and second camera 22, 24 have respective inlet pupils 38a, 38b, a respective optical axis 40a, 40b and, in this case, the same focal length f. The spatial area point 34 is imaged on the first image sensor 26 at a distance $h_M$ from the optical axis 40a. The corresponding distance for the second camera 24 is $h_H$. The optical axes 40a, 40b of the first and second camera 22, 24 are offset parallel to one another by a defined base width b. The distances between the respective inlet pupils 38a, 38b and the spatial area point 34 are designated by $d_M$ and $d_H$. These distances values $d_M$, $d_H$ are determined by propagation time measurement, and are then checked for plausibility using an approach based on triangulation in this embodiment.

The triangulation-based check is based on the following relationships. On the one hand, the beam set results in the following relationship:

$$\frac{z_M}{f} = \frac{d_M}{y} \text{ and } \frac{z_H}{f} = \frac{d_H}{x} \qquad (1)$$

where z is the perpendicular distance between the camera and the spatial point 34, d is the oblique distance between the inlet pupil of the camera and the spatial point, f is the focal length and y is the oblique distance between the inlet pupil and the image point where the spatial point is imaged. Application of Pythagoras Law, multiplication by the focal length f and elimination of the variable y result in:

$$z_M = f \cdot \frac{d_M}{y} = f \cdot \frac{d_M}{\sqrt{h_M^2 + f^2}} \qquad (2)$$

Advantageously, the two cameras 22, 24 are designed such that the optical axes 40a, 40b are at right angles to a plane parallel to the base width b. In consequence $z_M = z_H = z$. On the other hand, the following relationship is obtained from the basic triangulation equation:

$$\frac{z}{b} = \frac{f}{h_M - h_H} \text{ and } z = f \cdot \frac{b}{h_M - h_H} \qquad (3)$$

Equating equations (2) and (3) and solving for $h_H$ results in:

$$h_H = h_M - b \frac{\sqrt{h_M^2 + f^2}}{d_M} \qquad (4)$$

A nominal distance value $d_{Hber}$ can now be calculated from the geometric relationships, and this must match the distance value $d_H$ measured from the propagation time. The following relationship is obtained from the equation (1) and $z_M = z_H = z$:

$$\frac{d_{Hber}}{x} = \frac{d_M}{y} \qquad (5)$$

The nominal distance value $d_{Hber}$ is obtained as follows, after reorganization of the equation and application of Pythagoras' Law twice:

$$d_{Hber} = d_M \cdot \frac{\sqrt{h_H^2 + f^2}}{\sqrt{h_M^2 + f^2}} \quad (6)$$

This relationship is used to check the plausibility of the measured first distance value $d_H$ by comparing the first distance value $d_H$, determined from the propagation time, with the distance value $d_{Hber}$, calculated from the geometric relationship and the second distance value $d_M$. The measured first distance value $d_H$ and the calculated distance value $d_{Hber}$ must be at least largely the same. Otherwise, the measurement is incorrect, as is illustrated by way of example in FIG. 3.

FIG. 3 shows a situation in which an object 32 with a spatial area point 34 is located outside the unambiguity ranges "e" of the cameras 22, 24. The unambiguity range e is the spatial area in front of each of the cameras, at which the distance to an object can be determined unambiguously by means of the propagation time measurement. The unambiguity range is bounded by the time measurement period, because a reflected light beam is always associated with the current measurement period. In consequence, an object a long way away can produce a reflected light signal which does not arrive at the camera until the associated measurement period has elapsed, and therefore after transmission of a further measurement signal. The camera itself cannot identify the fact that the reflected light signal originates from an object located much further away, and it therefore incorrectly produces an excessively short distance. This is illustrated in FIG. 3.

In FIG. 3, an object 32 is arranged outside the unambiguity ranges e. The light signal reflected from the object 32 arrives at the image recording units 22, 24 only after the next measurement period has started, because it is so far away. A first distance value $d_M$ relating to a first apparent object 42 is therefore determined by means of the first camera 22, and a second distance value $d_H$ relating to a second apparent object 44 is determined by means of the second camera 24. The apparent objects 42, 44 do not actually exist. They appear only because of the ambiguity in the propagation time measurement.

Figure 4:
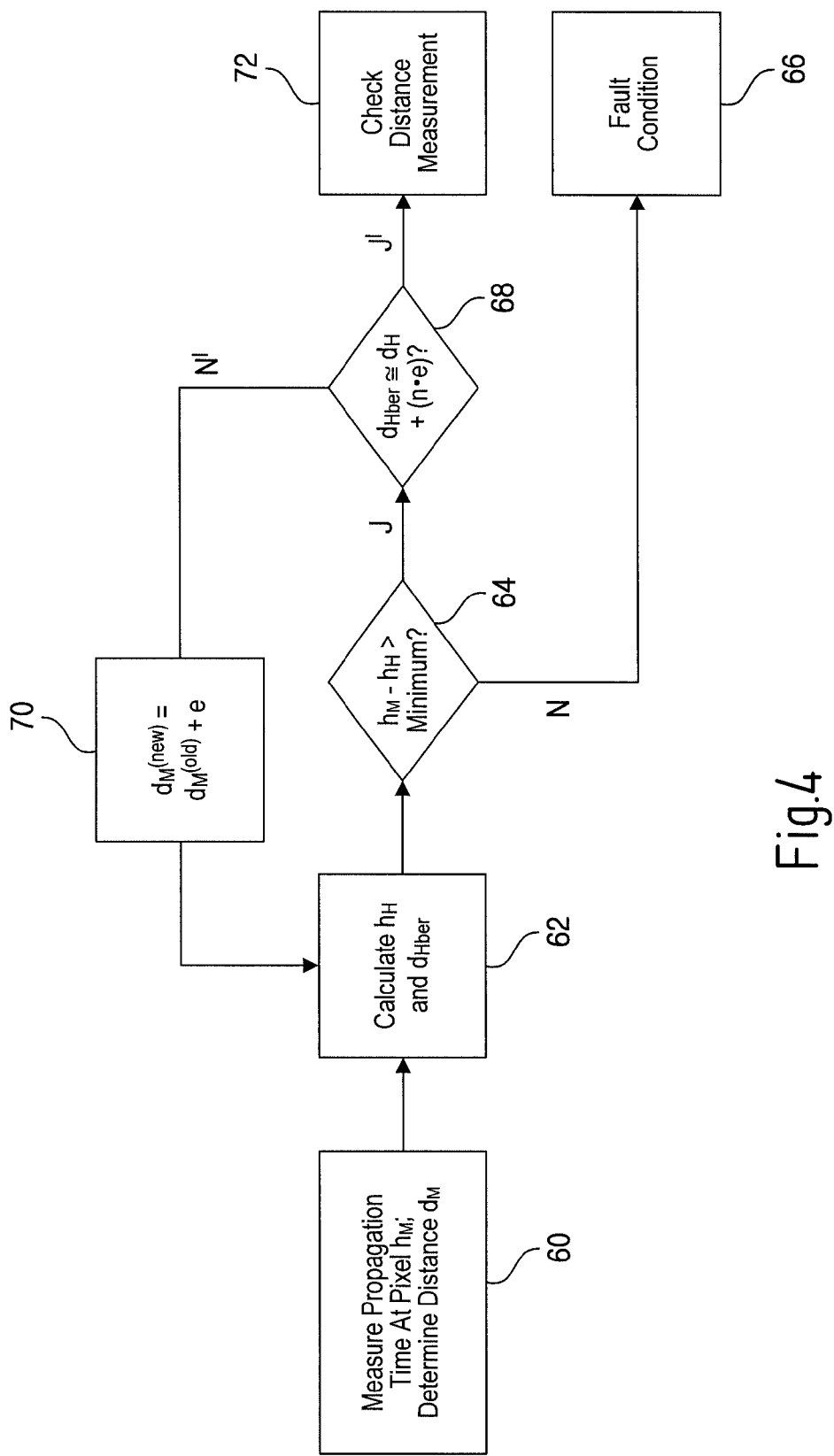
FIG. 4 shows a sketch in order to explain one preferred application of a method according to the invention.

However, if the nominal distance value $d_{Hber}$ is now calculated using equation (6), then this value differs from the second distance value $d_H$. This discrepancy could be caused by a malfunction of the apparatus 10 or, as assumed, could be caused by the ambiguity. In one exemplary embodiment of the invention, the ambiguity can be resolved by using an iterative search algorithm in which the plausibility check is repeated on the assumption that the actual distance to the object is greater by an integer multiple of the unambiguity range than the distance first of all determined from the propagation time measurement. Resolution of the ambiguity in this way will now be explained with reference to FIG. 4.

In a first step 60, the propagation time is measured at the pixel position $h_M$ and the corresponding first distance value $d_M$ is determined. In the next step 62, the corresponding pixel with its pixel position $h_H$ is determined using the equation (4), and the nominal distance value $d_{Hber}$ to be expected for this pixel is calculated. A check is carried out in the next step 64 to determine whether the pixel positions $h_M$, $h_H$—in each case related to the respective optical axis 40a, 40b—differ at least by a specific value, in particular by at least half a pixel. If this is not the case, then a jump is made via the path N. It is then found in a step 66 that there is either a fault in the camera system or the spatial area point does not lie in the common coverage range 30. If the pixel positions $h_M$, $h_H$ differ sufficiently from one another, then a jump is made to step 68 via the path J. An iterative check is carried out here to determine whether the nominal distance value $d_{Hber}$ can possibly be described as the sum of the second distance value $d_H$ and a multiple of the unambiguity range $(d_H+n\cdot e)$. Additionally or alternatively, it is possible to check whether the gray-scale values of the pixels of the first and of the second image recording units 22, 24 are the same. If this is not the case, that is to say no match can be found, a jump is made to step 70 via the path N'. The first distance value $d_M$ is now incremented here by the unambiguity range e. The method is then continued in the step 62, with a new attempt being started to produce a match. If a match has already been found in step 68, then a jump is made via the path J' to the step 72, where the plausibility of the distance measurement is checked. The distance information obtained can then be used to produce the image, and for matching to the reference image.

Alternatively or additionally, ambiguities can also be resolved by using a illumination device 20 which emits light at different modulation frequencies. For example, if light is emitted at a first frequency of 15 MHz and at a second frequency of 13 MHz, then this results in different unambiguity ranges of 10 meters and 11.5 meters, respectively. Since the lowest common multiple of these two frequencies does not occur until a distance of 230 m, unambiguous distance information can be associated with objects at a distance of up to 230 m.

In addition to the described propagation type measurement, distance determination by means of a stereoscopic method is also carried out in other exemplary embodiments. The redundant distance information thus obtained means that there is no need for iterative calculation for object distances beyond the unambiguity range.

Figure 5:
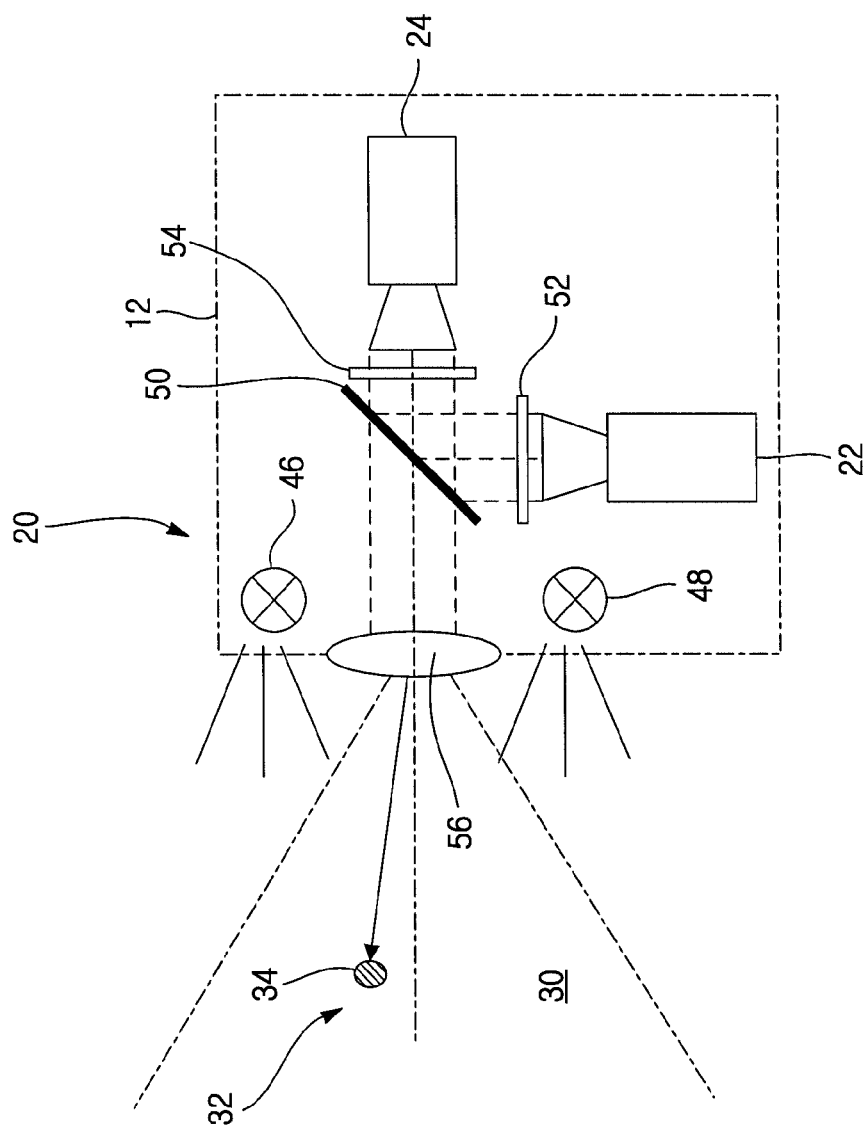
FIG. 5 shows a schematic illustration of a further apparatus according to the invention.

A further exemplary embodiment is illustrated in FIG. 5. The sensor part 12 shown here has an illumination device 20, a first camera 22 and a second camera 24. The illumination device 20 in this case comprises a first light source 46 and a second light source 48, with the respectively emitted light being at different wavelengths. The sensor part 12 also has a beam splitter 50. A first optical filter element 52 and a second optical filter element 54 are also respectively arranged in the image recording units 22, 24. The pass band frequencies of the filter elements 52, 54 are in this case designed such that the first camera 22 primarily receives the light emitted from the first light source 46 and reflected, while the second camera 24 primarily receives the light emitted from the second light source 48 and reflected. For the sake of completeness, a lens 56 is also shown. This is an arrangement with two cameras and two light sources at different wavelengths with different modulation frequencies also being used in this exemplary embodiment. The beam splitter 50 splits the incident light signals between the two image recording units 22, 24. The optical filter elements 52, 54 block the light signals for the respective other image recording unit 24, 22. This exemplary embodiment allows direct association of the pixels in the first and second camera 22, 24, where the same spatial area point 34 is imaged. In addition, the first and second distance values $d_M$, $d_H$ can be compared directly with one another. Potential ambiguities can be resolved on the basis of the different modulation frequencies. Since, and in addition, both cameras look through the same lens 56, there are no shadowing effects.

Possible fields of use for the described apparatus and the described method occur whenever correct operation of a distance-measuring image recording unit is absolutely essential for safety reasons. This includes, inter alia, systems for monitoring dangerous machines and installations, systems for monitoring valuable items (object safeguarding, access safeguarding, strong room monitoring systems, etc.), as well as systems in the field of quality control and quality assurance.

What is claimed is:

1. An apparatus for safeguarding a hazardous area of an automatically operated installation, the apparatus comprising:
   an image recording unit having a first camera designed to record a first image and having a second camera designed to record at least one second image of the hazardous area, the first and second cameras each comprising an image sensor having a plurality of pixels for imaging a plurality of area points located in the hazardous area,
   an illumination device designed to emit light signals into the hazardous area in order to illuminate the plurality of area points,
   an evaluation unit designed to determine a first distance value for at least one area point by means of a propagation time measurement using the light signals and using the first image from the first camera, the propagation time measurement having a limited unambiguity range,
   a control unit configured to initiate a safety function depending on the distance value determined, the safety function being configured to safeguard the installation, and
   a test device designed to detect an incorrectly determined distance value resulting from the limited unambiguity range, the test device being designed to check the distance value by means of the second image including said at least one area point from the second camera.

2. The apparatus of claim 1, wherein the test device is designed to generate a fault signal if an incorrectly determined distance value is detected.

3. The apparatus of claim 1, with the test device further being designed to correct an incorrectly determined distance value by means of the second image in order to produce and transmit a corrected distance value to the control unit.

4. The apparatus of claim 1, further comprising a modulation device designed to modulate the light signals with a first modulation frequency and with at least one second modulation frequency which is different from the first modulation frequency.

5. The apparatus of claim 1, wherein the evaluation unit is designed to determine a second distance value for the at least one area point by means of a propagation time measurement using the light signals and the second image, the test device being configured to compare the first and second distance values in order to detect any incorrect distance value.

6. The apparatus of claim 1, further comprising a beam splitter for splitting light signals reflected from the spatial area point between the first and the second camera.

7. The apparatus of claim 1, wherein the first camera comprises a first optical filter having a first wavelength pass band, the second camera comprises a second filter having a second wavelength pass band different from the first wavelength pass band, and the illumination device is designed to emit light signals which substantially correspond either to the first or to second wavelength pass band, so that the first and second cameras receive substantially different light signals from the area points.

8. The apparatus of claim 1, wherein the first and the second camera are arranged parallel to one another and spaced apart by a defined base width in order to produce a stereoscopic image of the hazardous area from the first and second images, the test device using the stereoscopic image for checking the distance value.

9. The apparatus of claim 1, wherein the test device uses a triangulation approach for checking the distance value, said triangulation approach exploiting optically relevant geometries of the first and second camera.

10. A method for safeguarding a hazardous area of an automatically operated installation, comprising the steps of:
    emitting light signals into the hazardous area by means of an illumination device in order to illuminate a plurality of area points located in the hazardous area,
    recording at least one first and one second image of the hazardous area by means of an image recording unit comprising a first camera for recording the first image and comprising a second camera for recording the second image, the first and second cameras each comprising an image sensor having a plurality of pixels for imaging the plurality of area points,
    determining a first distance value for at least one area point by means of a propagation time measurement using the light signals and the first image from the first camera, the propagation time measurement having a limited unambiguity range,
    checking the distance value by means of the second image including said at least one area point from the second camera in order to detect any incorrectly determined distance value resulting from the limited unambiguity range, and
    initiating a safety function depending on the distance value for safeguarding the installation.

11. The method of claim 10, wherein the safety function is initiated, when an incorrect distance value resulting from the limited unambiguity range is detected.

12. The method of claim 10, wherein a corrected distance value is determined by means of the second image, said corrected distance value being used for deciding if the safety function has to be initiated.

13. The method of claim 10, wherein the first image is recorded on emission of light signals having a first modulation frequency, and the second image is recorded on emission of light signals having a second modulation frequency, said first and second modulation frequencies resulting in different first and second unambiguity ranges.

14. The method of claim 10, wherein a second distance value for the at least one area point is determined by means of a propagation time measurement using the light signals and the second image, and the first and second distance values are compared in order to detect any incorrectly determined distance value.

15. The method of claim 10, wherein a stereoscopic image of the hazardous area is produced from the first and second images, and wherein distance information from the stereoscopic image is used in order to check the distance value determined using the propagation time measurement.

16. An apparatus for monitoring a spatial area, comprising an illumination device which at least temporarily emits first light signals into the spatial area, comprising an image recording unit having a first camera and a second camera for recording a first image and at least one second image of the spatial area, said first and second camera each comprising an image sensor having a plurality of pixels for imaging a plurality of spatial area points, comprising an evaluation unit designed to determine a first distance value for at least one of the spatial area points using a first propagation time measurement in conjunction with the first image and the first light signals, comprising a control unit which initiates a safety function depending on the first distance value, and comprising a test device designed to check the first distance value by means of a reference distance value determined for the at least one spatial area point, said reference distance value being determined by means of the second image from the second camera.

17. The apparatus of claim 16, wherein the first and the second camera are arranged parallel to one another and spaced apart by a defined base width in order to produce a stereoscopic image of the spatial area from the first and second images, the test device using a reference distance value determined from the stereoscopic image.

18. The apparatus of claim 16, further comprising a modulation device designed to produce the first light signals with a first modulation frequency and to produce second light signals having a second modulation frequency which is different from the first modulation frequency, the evaluation unit being further designed to determine the reference distance value by means of a second propagation time measurement using the second light signals and the second image.

* * * * *